W. F. Converse,
Bed Bottom,
Nº 32,683. Patented July 2, 1861.
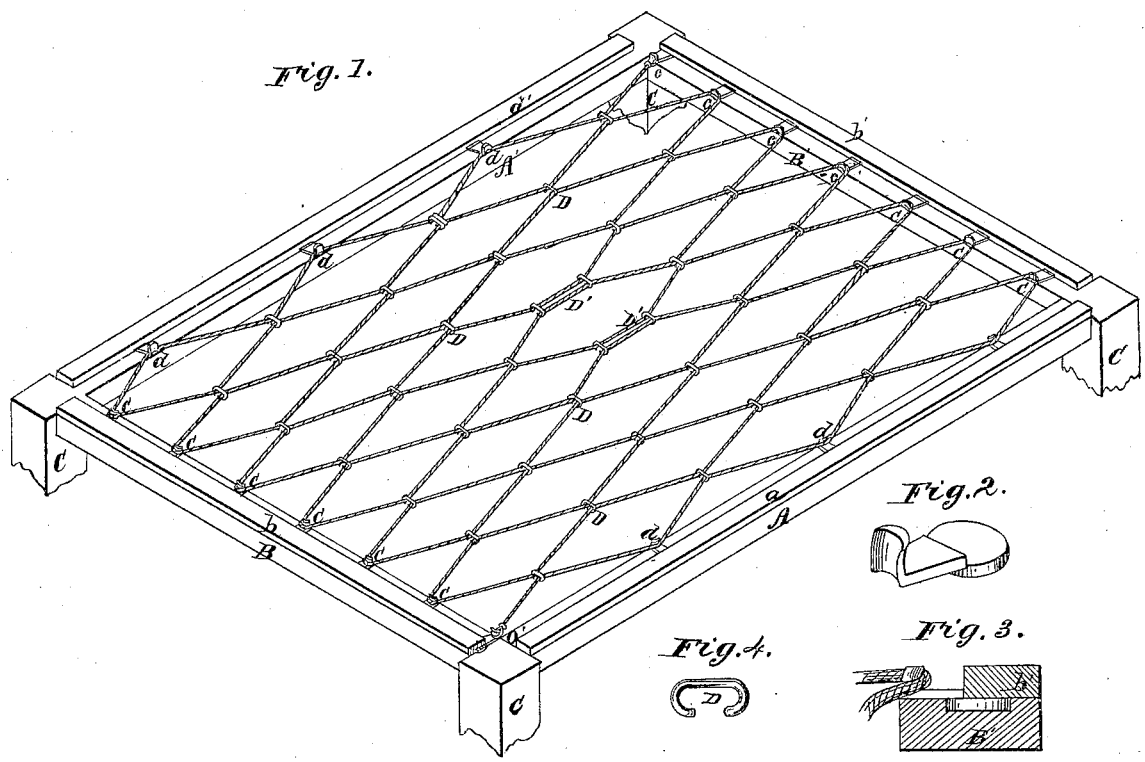
Witnesses
Inventor.

UNITED STATES PATENT OFFICE.

WILLIAM F. CONVERSE, OF HARRISON, OHIO.

BED-BOTTOM.

Specification of Letters Patent No. 32,683, dated July 2, 1861.

*To all whom it may concern:*

Be it known that I, WILLIAM F. CONVERSE, of Harrison, Hamilton county, State of Ohio, have invented certain new and useful Improvements in Elastic Bottoms for Beds, Chairs, Lounges, &c.; and I do hereby declare the following to be a full, clear, and exact description thereof, reference being had to the accompanying drawings, making part of this specification.

My invention relates to the formation of an elastic cord or wire bottom for beds, chairs, lounges, &c., with an almost unlimited provision for tightening, and consists in a device for converting the right lines of a longitudinally stretched cord or wire into a series of lateral or diagonal deflections in successively opposite directions, the tendency and purpose being to stretch and consequently tighten the cord or wire, and give a uniform elasticity to the whole surface; the device (without the necessity of removing or loosening the cords from the pins) allowing changes to be made at any time in the shape and number of the meshes or deflections to effect a long range of tightening.

My invention further consists in an improved form and attachment of cord pin, to admit of lighter rails being used for bedsteads with less danger of their being split in use.

In the accompanying drawings of a bed bottom embodying my improvements Figure 1 is a perspective view of the rails and stretched cord. Figs. 2 and 3 are perspective and sectional views respectively of my improved cord pin.

A A' and B, B' are side and end rails respectively of a bedstead and C the posts. The cord pins the form of which is clearly shown in Fig. 2 are embedded in the rails as represented in Fig. 3, and permanently secured by strips $a$, $a'$, $b$, $b'$, nailed or screwed down to the rails. This device it will be seen admits of lighter rails being used with less danger of splitting than with the old pin which latter requires a hole to be bored so deep as to materially affect the strength of the rail.

The elastic bottom is formed by first stretching the cord or wire from point $o$ to point $o'$ longitudinally backward and forward over the pins $c$ in the end rails. The cord is then slipped over the pins $d$ in the side rails, and the open links D are woven or meshed in by forcing double lines of the cord together with the fingers and slipping the links over at regular intervals as shown so as to resemble in the whole meshes of net work, the effect of the meshes or linked deflections being to tighten the cord throughout its whole surface and give it a uniform and durable elasticity.

The bottom can be tightened at any time after its first formation by slipping over an additional link to each mesh and separating them by sliding as at D', thus tightening the cord by changing the shape of the meshes, or the cord can be at any time tightened by increasing the number of meshes by using additional links.

The open link of which an enlarged view is shown at Fig. 4 can either be rigid as represented or elastic by being coiled spring form between the hooks.

I claim as new and of my invention herein—

1. Forming a tight elastic cord or wire bottom for beds, chairs, lounges, &c., by forcing and securing the cord or wire into a series of alternate deflections by means of the open link D substantially as described.

2. The pin Fig. 2 and strips $a$ $a'$ $b$ $b'$ constructed and attached substantially as and for the purpose stated.

In testimony of which invention, I hereunto set my hand.

WM. F. CONVERSE.

Witnesses:
FRANCIS MILLWARD,
H. COLLIER.